United States Patent [19]

Zecher et al.

[11] Patent Number: 4,472,567

[45] Date of Patent: Sep. 18, 1984

[54] PROCESS FOR THE PRODUCTION OF POLYAMIDE IMIDES

[75] Inventors: Wilfried Zecher; Rudolf Merten; Willi Dünwald, all of Leverkusen, Fed. Rep. of Germany

[73] Assignee: Bayer Aktiengesellschaft, Leverkusen, Fed. Rep. of Germany

[21] Appl. No.: 525,156

[22] Filed: Aug. 22, 1983

[30] Foreign Application Priority Data

Sep. 1, 1982 [DE] Fed. Rep. of Germany ....... 3232464

[51] Int. Cl.$^3$ ............................................. C08G 18/18
[52] U.S. Cl. ..................................... 528/52; 524/736; 528/45; 528/73
[58] Field of Search ............................. 528/52, 73, 45; 524/736

[56] References Cited

U.S. PATENT DOCUMENTS

| | | | |
|---|---|---|---|
| 3,658,773 | 4/1972 | Zecher et al. | 528/52 |
| 3,830,785 | 8/1974 | Matsui et al. | 528/45 |
| 3,833,525 | 9/1974 | Orlando et al. | 528/45 |

*Primary Examiner*—Herbert S. Cockeram
*Attorney, Agent, or Firm*—Connolly and Hutz

[57] ABSTRACT

The condensation of organic polyisocyanates, lactams, and cyclic polycarboxylic acid anhydrides in the presence of mono- or disubstituted imidazole catalyst results in a polyamide imide having an increased softening temperature.

9 Claims, No Drawings

PROCESS FOR THE PRODUCTION OF POLYAMIDE IMIDES

This invention relates to a process for the production of polyamide imides.

It is known that aliphatic-aromatic polyamide imides may be obtained by condensing organic polyisocyanates with cyclic polycarboxylic acid anhydrides, for example trimellitic acid anhydride, and lactams (DE-OS No. 1,770,202). The reaction products are distinguished by certain properties, including the solubility of the pre-condensates in phenolic solvents and high-elasticity values. They are used as high temperature-resistant coatings, for example in the field of electrical insulating lacquers.

It has now been found that polymers having considerably improved properties may be obtained by carrying out the condensation or organic polyisocyanates, such as aliphatic, aliphatic-aromatic and aromatic diisocyanates, with lactams and cyclic polycarboxylic acid anhydrides at temperatures of from 0° to 450° C., optionally in a solvent, in the presence of from 0.01 to 5%, by weight, preferably from 0.2 to 2%, by weight, of a 2-alkyl imidazole.

The reaction products are distinguished by an increase in the softening temperatures thereof which had not been expected of an aliphatic-aromatic system. Hitherto, it has proved impossible to achieve this result even by other measures, for example the incorporation of isocyanurates as described in DE-OS No. 2,542,706, without the other properties, such as elasticity and abrasion resistance, being adversely affected. In the wire lacquering field, it is thus possible to obtain a significant increase in lacquering speed without an effect on the properties of the system.

Polyisocyanates of the type described, for example, in DE-OS No. 1,770,202 may advantageously be used in the process according to the present invention.

It is particularly preferred to use phosgenated aniline/formaldehyde condensates having a polyphenylenemethylene structure, technical mixtures of tolylene diisocyanates, m-phenylene diisocyanate and the symmetrical compounds 4,4'-diisocyanato-diphenyl methane, 4,4'-diisocyanato-diphenyl ether, naphthylene-(1,5)-diisocyanate, p-phenylene diisocyanate, 4,4'-diisocyanato-diphenyl dimethyl methane, analogous hydroaromatic diisocyanates and also aliphatic diisocyanates containing from 2 to 12 carbon atoms, such as hexamethylene diisocyanate, and diisocyanates derived from isophorone.

Instead of using isocyanates, it is also possible to use compounds which react like isocyanates under the reaction conditions, preferably the addition compounds thereof with phenols and lactams, for example phenol, technical cresol mixtures and caprolactam or mixtures of the amines corresponding to the isocyanates and aliphatic and aromatic carbonic acid esters, for example carbonic acid diethyl ester, carbonic acid diphenyl ester and ethylene carbonate, which may even have been partly reacted with one another.

The cyclic polycarboxylic acid anhydrides used in accordance with the present invention may be compounds of the type described in DE-OS No. 1,770,202 and DE-OS No. 2,542,706, preferably polycarboxylic acid anhydrides corresponding to the following general formula:

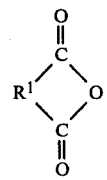

wherein $R^1$ represents an optionally substituted $C_2$–$C_{20}$ aliphatic radical, a $C_5$–$C_{10}$ cycloaliphatic radical, an aliphatic-aromatic radical containing from 1 to 10 carbon atoms in the aliphatic portion and from 6 to 10 carbon atoms in the aromatic portion or an aromatic radical containing from 6 to 10 carbon atoms which, in addition to the cyclic anhydride group, contains at least one other cyclic anhydride group or a carboxyl group. Examples of such compounds are butane tetracarboxylic acid dianhydride, cyclopentane tetracarboxylic acid dianhydride, pyromellitic acid dianhydride, benzophenone tetracarboxylic acid dianhydride and, preferably, trimellitic acid anhydride.

Instead of using carboxylic acid anhydrides, it is also possible to use derivatives, such as alkyl or phenyl esters, or the polycarboxylic acids themselves which are converted into the acid anhydrides in the course of the reaction.

Lactams suitable for use in accordance with the present invention are, for example, lactams corresponding to the following general formula:

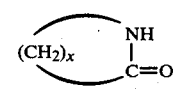

wherein x represents an integer of from 2 to 20. Caprolactam and dodecane lactam are preferably used.

Instead of using lactams, it is also possible, for example, to use polyamides, such as polycaproic amide or polydodecanoic acid amide, as described, for example, in DE-OS No. 1,956,612.

According to the present invention, the catalyst used is a disubstituted imidazole, such as a 2-alkyl imidazole corresponding to the following general formula:

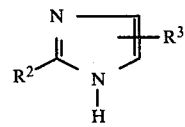

wherein $R^2$ represents a straight- or branched-chain alkyl radical containing from 1 to 20 carbon atoms which may optionally be substituted by an aromatic radical containing from 6 to 10 carbon atoms;

$R^3$ represents hydrogen, an alkyl radical containing from 1 to 20 carbon atoms, an aralkyl radical containing from 6 to 10 carbon atoms in the aryl portion and from 1 to 10 carbon atoms in the alkyl portion or an aryl radical containing from 6 to 10 carbon atoms.

It is preferred to use 2-alkyl imidazoles corresponding to general formula (III) wherein $R^2$ represents a straight- or branched-chain alkyl radical containing from 1 to 10 carbon atoms and $R^3$ represents hydrogen. 2-methyl imidazole is particularly preferred.

The reaction according to the present invention may be carried out in solvents which do not react with the reactants or form only loose addition compounds under the reaction conditions. Suitable solvents, are for example, (halogenated) hydrocarbons, phenols, alcohols, esters, lactams, ketones, ethers, substituted amides, nitriles, phosphoric acid amides, sulphoxides and sulphones. Examples of these solvents are xylenes, o-dichlorobenzene, benzoic acid alkyl esters, butyrolactone, caprolactone, acetophenone, cyclohexanone, benzyl alcohol, ethylene glycol, glycol monomethyl ether acetate, diethylene glycol monoethyl ether, diethylene glycol dimethyl ether, dimethyl formamide, N-methyl pyrrolidone, benzonitrile, hexamethyl phosphoric acid triamide, dimethyl sulphoxide, tetramethylene sulphone and mixtures thereof. Preferred solvents are phenols, such as phenol, and technical mixtures of o-, m- and p-cresol.

To carry out the process according to the present invention, the reactants are maintained at temperatures of from 0° to 380° C. for from a few minutes to several hours in the presence or absence of a solvent. The course of the reaction may be followed, for example, from the evolution of gas, from the increase in viscosity and from IR-spectra.

In some cases, it is advantageous to carry out the reaction in several stages or to add the individual reactants in a different sequence or at different temperatures. It has proved to be particularly advantageous to prepare a pre-condensate of polyisocyanate, cyclic carboxylic acid anhydride and lactam in the absence of the catalyst used according to the present invention at temperatures of from 50° to 220° C. and then after addition of the catalyst, to condense the resulting precondensate to completion at temperatures of from 170° to 450° C.

In general, one equivalent (val) of carboxylic acid or cyclic carboxylic acid anhydride is reacted per val of isocyanate and one val of lactam per val of carboxylic acid anhydride.

In another possible embodiment, excess isocyanate is reacted with di- or tri-carboxylic acid, such as adipic acid, terephthalic acid, isophthalic acid or trimesic acid, or with polyglycine esters, such as bis-[methoxycarbonylisopropylaminophenyl-(4)]-methane.

The present reaction may be influenced by additional catalysts, for example by amines, such as triethylamine, 1,4-diazabicyclo-(2,2,2)-octane and N-ethyl morpholine and N-methyl imidazole, by inorganic and organic metal compounds, particularly compounds of iron, lead, zinc, tin, copper, cobalt and titanium, such as iron(III) chloride, cobalt acetate, lead oxide, lead acetate, tin octoate, dibutyl tin dilaurate, copper acetyl acetonate, titanium tetrabutylate, alkali metal phenolates and sodium cyanide, by phosphorus compounds, such as trialkyl phosphine and methyl phospholine oxide.

The polyamide imides obtainable by the process according to the present invention are distinguished by particular temperature resistance and by high softening temperatures and may be used as lacquers, films and mouldings. The properties thereof may be varied for the various applications by changing the stoichiometric ratio and the degree of condensation and by adding fillers, pigments and low molecular weight and high molecular weight components.

EXAMPLES 1.1 Production of the starting material:

250 g of 4,4-diisocyanatodiphenyl methane and then 192 g of trimellitic acid anhydride were introduced in portions with cooling at from 120° to 130° C. into a solution of 113 g of caprolactam in 190 g of phenol and 190 g of a technical cresol mixture. The temperature was then increased and the mixture stirred at 170° C. for 3 hours, at 190° C. for 2 hours and at 205° C. for 4 hours. The condensation reaction was accompanied by the elimination of carbon dioxide. 260 g of phenol/cresol were distilled off in vacuo. After pouring out, the reaction product solidified on cooling to form a clear, brittle resin having a solids content of approximately 80%, by weight.

The viscosity $[\eta^{25}]$ of a 15% by weight solution in cresol amounts to 650 mPas.

1.2 Production of the polyamide imide:

250 g of the resin produced in accordance with 1.1 were dissolved in 500 g of phenol:cresol (1:1) and 2 g of 2-methyl imidazole dissolved in 10 g of cresol were stirred into the resulting solution.

A 0.7 mm diameter copper wire was lacquered with this lacquer mixture up to an increase in diameter of from 45 to 50 μm.

Lacquering conditions:
Oven: vertical oven
Oven length: 4 meters
Oven temperature: 400° C.

A lacquered copper wire, of which the insulation has a long-term thermal stability of >1550° C., should show only minimal thermoplasticity, i.e. its insulating layer should only soften at temperatures of >300° C.

Accordingly, a degree of stoving which, in this test, produces values of >300° C. is inadequate. This must be taken into account in selecting the lacquering speed.

Where the temperature prevailing in the stoving tunnel is fixed, the residence time of the wire determines the degree of stoving and hence the degree of cross-linking. Accordingly, the higher the lacquering speed, the lower the degree of cross-linking.

In the wire lacquering test described above, a softening temperature of 375° C. (DIN 46 453 10.2) was measured for a lacquering speed of 10 meters per minute.

If lacquering is carried out without the catalyst, the measured softening temperature is only 280° C.

We claim:

1. In the process for production of polyamide imide by condensation of organic polyisocyanates, lactams and cyclic polycarboxylic acid anhydrides at temperatures of from 0° to 450° C.,
    the improvement comprises carrying out the condensation in the presence of 0.01 to 5% by weight of a monosubstituted or disubstituted imidazole as catalyst.

2. A process as claimed in claim 1, characterised in that a pre-condensate of polyisocyanate, cyclic carboxylic acid anhydride and lactam is prepared at a temperature of from 50° to 220° C. and, after addition of the catalyst, is further reacted at a temperature of from 170° to 450° C.

3. A process as claimed in claim 1, characterised in that a substituted imidazole corresponding to the following general formula:

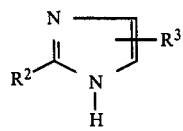

wherein

R² represents a straight- or branched-chain alkyl radical containing from 1 to 20 carbon atoms which may optionally be substituted by an aromatic radical containing 6 carbon atoms; and R³ represents hydrogen, an alkyl radical containing from 1 to 20 carbon atoms, an aralkyl radical containing from 6 to 10 carbon atoms in the aryl portion and from 1 to 10 carbon atoms in the alkyl portion or an aryl radical containing from 6 to 10 carbon atoms is used.

4. A process as claimed in claim 1, characterised in that 2-methyl imidazole is used as catalyst.

5. A process as claimed in claims 1 or 2, characterised in that the reaction is carried out in a solvent.

6. A process as claimed in claim 1, characterised in that a phenolic solvent is used.

7. A process as claimed in claim 1, characterised in that a cyclic polycarboxylic acid anhydride corresponding to the following general formula:

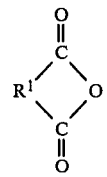

wherein

R¹ represents an optionally substituted $C_2$–$C_{20}$ aliphatic radical, a $C_5$–$C_{10}$ cycloaliphatic radical, an aliphatic-aromatic radical containing from 1 to 10 carbon atoms in the aliphatic portion and from 6 to 10 carbon atoms in the aromatic portion or an aromatic radical containing from 6 to 10 carbon atoms, which in addition to the cyclic anhydride group contains at least one other cyclic anhydride group or a carboxyl group; is used.

8. A process as claimed in claim 1, characterised in that trimellitic acid anhydride is used as the cyclic carboxylic acid anhydride.

9. Polycondensates obtained by the process claimed in claims 1 or 2.

* * * * *